US010146257B2

(12) United States Patent
Alonso et al.

(10) Patent No.: US 10,146,257 B2
(45) Date of Patent: Dec. 4, 2018

(54) FOLDABLE DEVICE HAVING SENSOR (71) Applicant: Microsoft Technology Licensing, LLC, Redmond, WA (US)

(72) Inventors: Vicente Calvo Alonso, Piispanristi (FI); Jouko Lång, Lieto (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/873,845

(22) Filed: Oct. 2, 2015

(65) Prior Publication Data

US 2017/0097660 A1 Apr. 6, 2017

(51) Int. Cl.
*G06F 1/16* (2006.01)
*G06F 3/041* (2006.01)
*G06F 3/03* (2006.01)

(52) U.S. Cl.
CPC .......... *G06F 1/1641* (2013.01); *G06F 1/1652* (2013.01); *G06F 1/1684* (2013.01); *G06F 3/03* (2013.01); *G06F 3/0412* (2013.01); *G06F 3/0414* (2013.01)

(58) Field of Classification Search
CPC .... G06F 1/1641; G06F 1/1652; G06F 1/1684; G06F 3/03
USPC ........................................................ 345/156
See application file for complete search history.

(56) References Cited

U.S. PATENT DOCUMENTS

| 7,194,912 | B2 | 3/2007 | Jordan et al. |
| 7,594,442 | B2 | 9/2009 | Kaiserman et al. |
| 7,730,547 | B2 | 6/2010 | Barrera et al. |
| 7,854,173 | B2 | 12/2010 | Cheng et al. |
| 8,132,468 | B2 | 3/2012 | Radivojevic |
| 8,237,674 | B2 | 8/2012 | Jiang et al. |
| 8,250,927 | B2 | 8/2012 | Anand et al. |
| 8,729,524 | B2 | 5/2014 | Rogers et al. |
| 8,752,438 | B2 | 6/2014 | Hatami et al. |
| 8,850,897 | B2 | 10/2014 | Eichhorn et al. |
| 8,943,897 | B2 | 2/2015 | Beauvais et al. |

(Continued)

FOREIGN PATENT DOCUMENTS

| CN | 103336036 A | * 10/2013 |
| EP | 2908236 A1 | 8/2015 |
| WO | 2007107522 A1 | 9/2007 |

OTHER PUBLICATIONS https://web.archive.org/web/20140220032110/https://www.americanpiezo.com/piezo-theory/pzt.html, retrieved Jun. 14, 2017.*
https://web.archive.org/web/20140220032110/https://www.americanpiezo.com/piezo-theory/pzt.html, retrieved Jun. 15, 2017.*
Wichmann, et al., "Direction Sensitive Bending Sensors Based on Multi-Wall Carbon Nanotube/Epoxy Nanocomposites", In Nanotechnology, vol. 19, Issue 47, Oct. 29, 2008, 2 pages.

(Continued)

*Primary Examiner* — Mark Edwards (57) ABSTRACT

In an embodiment, a foldable device having a sensor is described. In an embodiment, the device comprises: A folding area, wherein the folding area is configured to rotate according to an axis of rotation caused by folding the device, causing deformation of the folding area. The folding area comprises: a layer of strain sensitive material having particles, wherein conductivity of the strain sensitive material is configured to change when the layer experiences the deformation. The folding area comprises a layer of conductor lines configured to detect the change of the conductivity of the strain sensitive material, wherein the layer of the conductor lines includes a plurality of contacting points with the strain sensitive material.

20 Claims, 12 Drawing Sheets

(56) References Cited

U.S. PATENT DOCUMENTS

| | | | | |
|---|---|---|---|---|
| 2008/0067618 A1* | 3/2008 | Wang | ............... | B82Y 10/00 |
| | | | | 257/415 |
| 2009/0085866 A1* | 4/2009 | Sugahara | ........... | G03G 15/5016 |
| | | | | 345/156 |
| 2012/0313860 A1* | 12/2012 | Hashimura | ............ | B82Y 15/00 |
| | | | | 345/173 |
| 2013/0079693 A1* | 3/2013 | Ranky | ................... | H01L 41/314 |
| | | | | 602/28 |
| 2013/0181726 A1* | 7/2013 | Viallet | .................... | G01L 1/146 |
| | | | | 324/652 |
| 2013/0218050 A1* | 8/2013 | Eichhorn | ............... | B82Y 15/00 |
| | | | | 600/587 |
| 2014/0375660 A1* | 12/2014 | Tamaki | ................. | G06F 1/1643 |
| | | | | 345/522 |
| 2015/0378557 A1* | 12/2015 | Jeong | .................... | G06F 3/0488 |
| | | | | 715/835 |
| 2016/0116944 A1* | 4/2016 | Lee | ....................... | H04M 1/022 |
| | | | | 361/679.26 |

OTHER PUBLICATIONS

Anand, et al., "Quasi-Static and Dynamic Strain Sensing Using Carbon Nanotube/Epoxy Nanocomposite Thin Films", In Proceedings of Smart Materials and Structures, vol. 18, No. 4, Mar. 18, 2009, 2 pages.

Anand, et al., "The Dynamics of Polymerized Carbon Nanotubes in Semiconductor Polymer Electronics and Electro-Mechanical Sensing", In Nanotechnology, vol. 20, No. 14, Mar. 18, 2009, 2 pages.

"International Search Report and Written Opinion Issued in PCT Application No. PCT/US2016/051561", dated Dec. 12, 2016, 11 Pages.

"International Preliminary Report on Patentability Issued in PCT Application No. PCT/US2016/051561", dated Jan. 2, 2018, 7 Pages.

"Second Written Opinion Issued in PCT Application No. PCT/US2016/051561", dated Aug. 29, 2017, 6 Pages.

* cited by examiner

FOLDABLE DEVICE HAVING SENSOR

BACKGROUND

A gesture sensitive panel is an input device which allows a user to input a command to a computing device by selecting the indication content displayed on a screen of an image display device by using his or her fingers or other objects or gestures. A gesture here generally refers to physical interaction between a human or other objects and the touch sensitive panel. An example of the gesture is a touch on a touch sensitive panel.

In addition, a foldable display device is currently being developed. In this case, a gesture sensitive panel attached onto the flexible image display device is required to have foldable characteristics. Current progress in foldable display technologies is bringing new device formats available, for example rollable displays, bendable open-close display lids and whole devices.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, a foldable device having a sensor is described. In an embodiment, the device comprises: A folding area, wherein the folding area is configured to rotate according to an axis of rotation caused by folding the device, causing deformation of the folding area. The folding area comprises: a layer of strain sensitive material having particles, wherein conductivity of the strain sensitive material is configured to change when the layer experiences the deformation. The folding area comprises a layer of conductor lines configured to detect the change of the conductivity of the strain sensitive material, wherein the layer of the conductor lines includes a plurality of contacting points with the strain sensitive material.

In other embodiments, a foldable display module and a method are discussed along with the features of the device.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the present embodiments and is not intended to represent the only forms in which the present example may be constructed or utilized. However, the same or equivalent functions and sequences may be accomplished by different embodiments.

Although the present embodiments may be described and illustrated herein as being implemented in a foldable display device with a gesture sensitive display, these are only examples of a foldable device and not a limitation. As those skilled in the art will appreciate, the present embodiments are suitable for application in a variety of different types of foldable devices, for example in mobile devices, tablets, phablets, portable computers, lap tops, cameras, and wearable devices, netbook computers, personal digital assistants (PDAs), touchscreen devices connected to a video game console or set-top box, or any other computing device that has a bendable display unit and is enabled to apply it.

Figure 1:
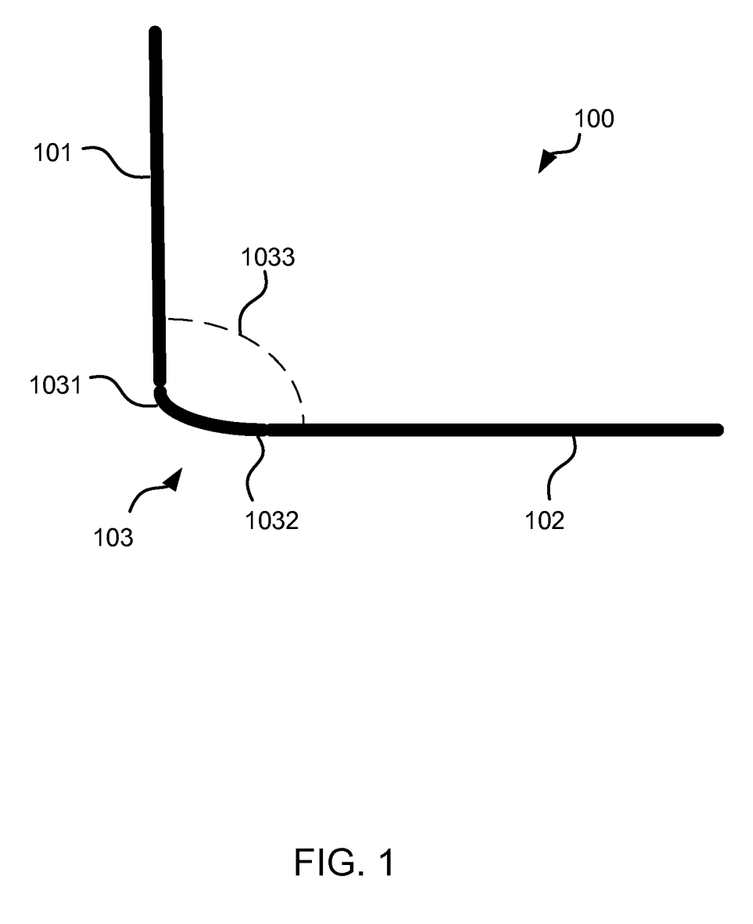
FIG. 1 illustrates a cross section of a schematic representation of a foldable display device in a position according to an embodiment.

FIG. 1 illustrates an embodiment of a foldable display device 100 including a folding area 103 which is configured to detect a position 1033 of the device 100.

According to an embodiment of FIG. 1, the device 100 comprises a first part 101 and a second part 102, for example a cover and a body, or two body parts, etc. The device 100 comprises a folding area 103. The folding area 103 is established between the parts 101 and 102. When the parts 101,102 are folded with respect to each other, the folding area 103 becomes deformed. According to an embodiment, the folding area 103 may include an area 1031 having more deformation than another area 1032. A position 1033 of the device 100 is established accordingly. For example, the first part 101 may be perpendicular with respect to the second part 102. The device 100 determines the position 1003, for example an angle between the first and the second parts 101,102. The device 100 comprises a sensor (not shown in FIG. 1) configured to detect the position 1033.

According to an embodiment the folding display device 100 includes layers which are configured to establish a display unit (not shown in FIG. 1) and the sensor. The layers establishing the sensor may be integrated within the foldable display device 100. Consequently, the layers of the sensor are between top and bottom layers and integrated inside these layers within the foldable display device 100.

According to an embodiment, the foldable display device 100 may be bendable. According to another embodiment, the foldable display device 100 may be flexible. The foldable display device 100 is subject to deformation. For example, substantial deformation may take place in the device 100 so that the degree of deformation is typically more than the nominal deformation of any non-foldable material. For example, hard plastic may be subject to very small non-bendable material flexibility when it is pressed. However, it is not subject to deformation. For example, even the slightest bending may break hard plastics. As another example, the parts 101,102 of the device 100 may be displaced with respect to each other in relation to the folding area 103 and an angle may be established between the parts 101,102.

According to an embodiment, a foldable display device 100 having various different positions includes a sensor to continuously read the position 1033 or a change in the position 1033. This can be used to feed back that information to a computing unit of the device 100. According to an embodiment, an action of the device 100 may be triggered based on the position 1033 or a change in the position 1033. The position reading may be based on a strain sensitive material which gives a respective reading according to a level of the deformation. According to an embodiment, a position change input may trigger calibration for the sensor so that a baseline of the sensor is changed according to a level of deformation.

Figure 2:
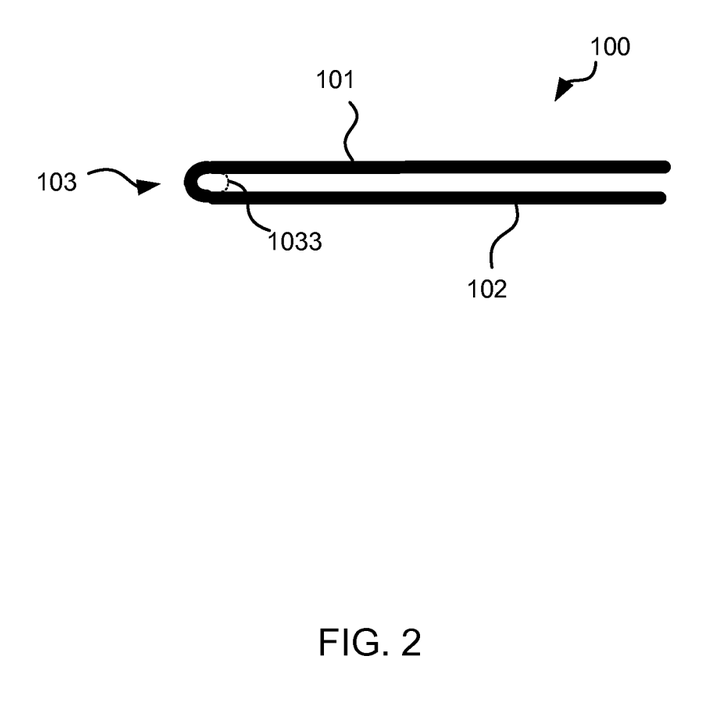
FIG. 2 illustrates a cross section of a schematic representation of the foldable display device in another position according to an embodiment.

FIG. 2 illustrates an embodiment of a foldable display device 100, including a folding area 103, which is configured to detect another position 1033 of the device 100.

In the embodiment of FIG. 2, another position 1033 of the device 100 is illustrated. In this position, parts 101 and 102 may be substantially parallel to each other. The device 100 is configured to detect the position 1033. The embodiment of FIG. 1 may be related to a use position of the device 100. The embodiment of FIG. 2 may be related to a closed position of the device 100.

Figure 3:
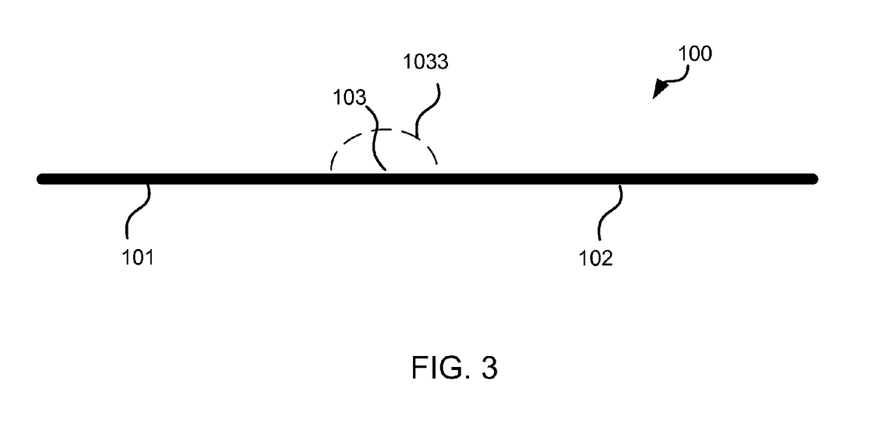
FIG. 3 illustrates a cross section of a schematic representation of the foldable display device in another position according to an embodiment.

FIG. 3 illustrates an embodiment of the foldable display device 100 in another position 1033. The device 100 may be substantially flat and the angle between the first and the second part 101,102 approximately 180 degrees. The surface of the folding area 103 may conform to the design of the surface of the first and the second parts 101,102. Consequently, the user may not detect the folding area 103 in this position 1033.

Figure 4:
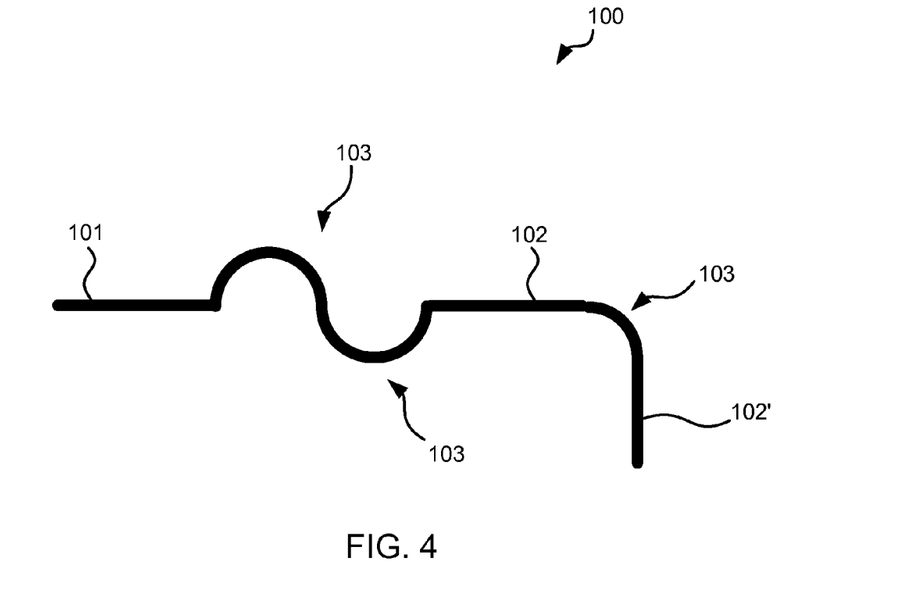
FIG. 4 illustrates a cross section of a schematic representation of a foldable display device having various foldable areas according to an embodiment.

FIG. 4 illustrates an embodiment of a foldable display device 100 having various foldable areas 103. Consequently, the device 100 can be disposed in a number of different positions.

Although embodiments of FIGS. 1 and 2 illustrate two parts 101,102 and a single folding area 103, the device 100 may have many parts 101,102,102' and many folding areas 103, as for example illustrated in FIG. 4. Consequently, there may be many different positions, and the device 100 may be configured to detect these positions or changes in these positions.

Figure 5:
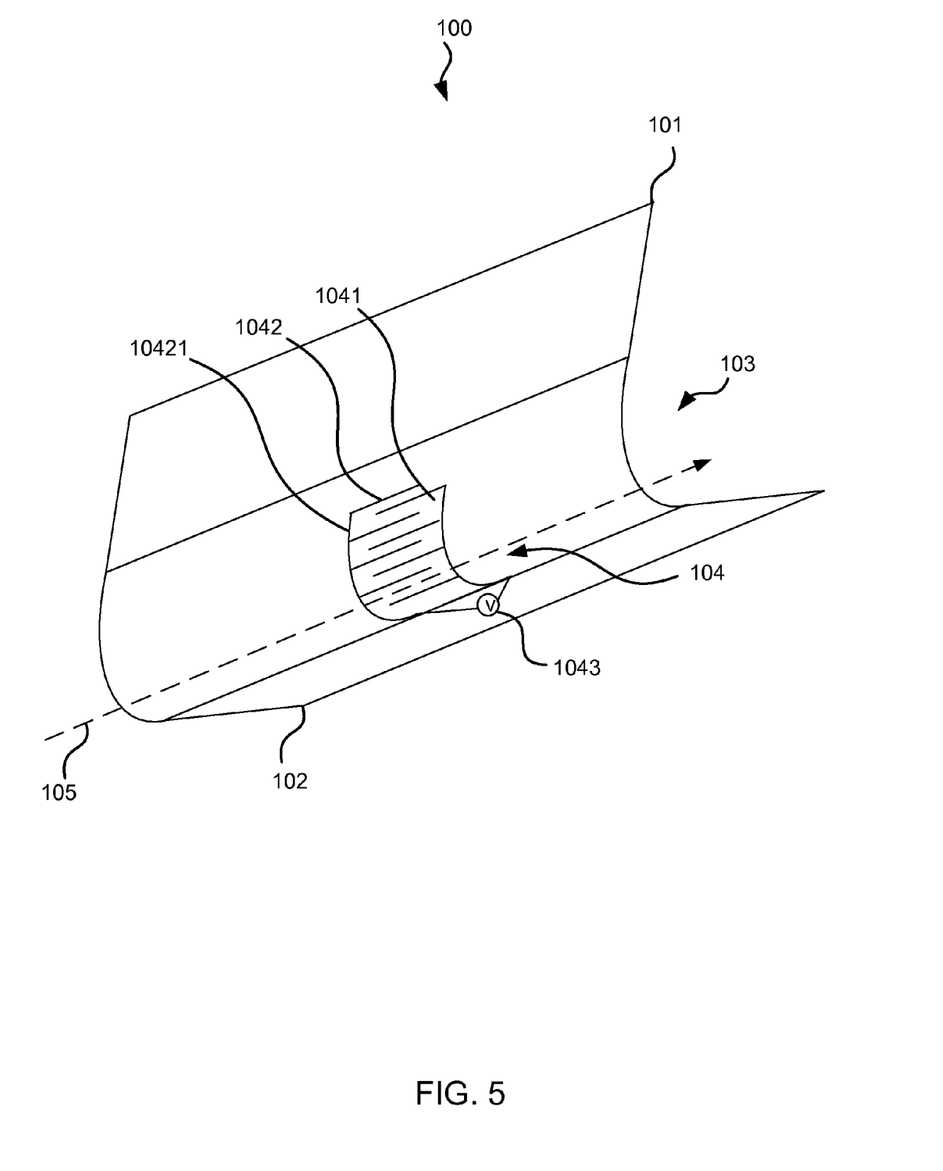
FIG. 5 illustrates a cross section of a schematic representation of a folding area with a sensor of the foldable display device according to an embodiment.

FIG. 5 illustrates a cross section of a schematic representation of a folding area 103 with a sensor 104 of the foldable display device 100 according to an embodiment.

The sensor 104 is illustrated in the folding area 103. The sensor 104 may be a strain gauge. The sensor 104 includes a layer of strain sensitive material 1041, a layer of conductor lines 1042 and a detector 1043. The sensor 104 conforms to the shape of the folding area 103. For example, when the device 100 is folded with respect to the folding area 103, the shape of the sensor 104 is deformed accordingly. An axis 105 of rotation of the folding area 103 is illustrated in FIG. 5 to illustrate the folding action. The deformation of the sensor 104 is configured with respect to the axis 105, for example so that a lower part of the sensor 104 is deformed more than the upper part of the sensor 104 in the embodiment of FIG. 5.

According to an embodiment the sensor 104 can be printed on a substrate of the display stack of the device 100. Consequently, the sensor 104 does not require too much extra space. The sensor 104 comprises the layer of conductor lines 1042. The conductor lines 1042 are substantially parallel to the axis 105 of rotation caused by folding the device 100. The sensor 104 comprises a collecting conductor line 10421, connected to the conductor lines 1042. The collecting conductor lines 10421 may be perpendicular or transversal to the axis 105. The strain sensitive material 1041 comprises conductive and/or semiconducting nanoparticle material. The electrical properties of these materials change significantly when subjected to deformation. Deformation by stretching makes nanoparticles separate from each other, thereby causing an increase in the resistance. Deformation by compression has the opposite effect: it makes nanoparticles get closer to each other, thereby decreasing the resistance. The detector 1043 detects the resistance. According to an embodiment the detector 1043 may be a voltage detector. The stretching of the sensor 104 can be monitored by measuring the changes in resistance of the sensor 104. This can be translated into a position 1031 of the device, for example into a bending/folding angle of the device 100.

Figure 6:
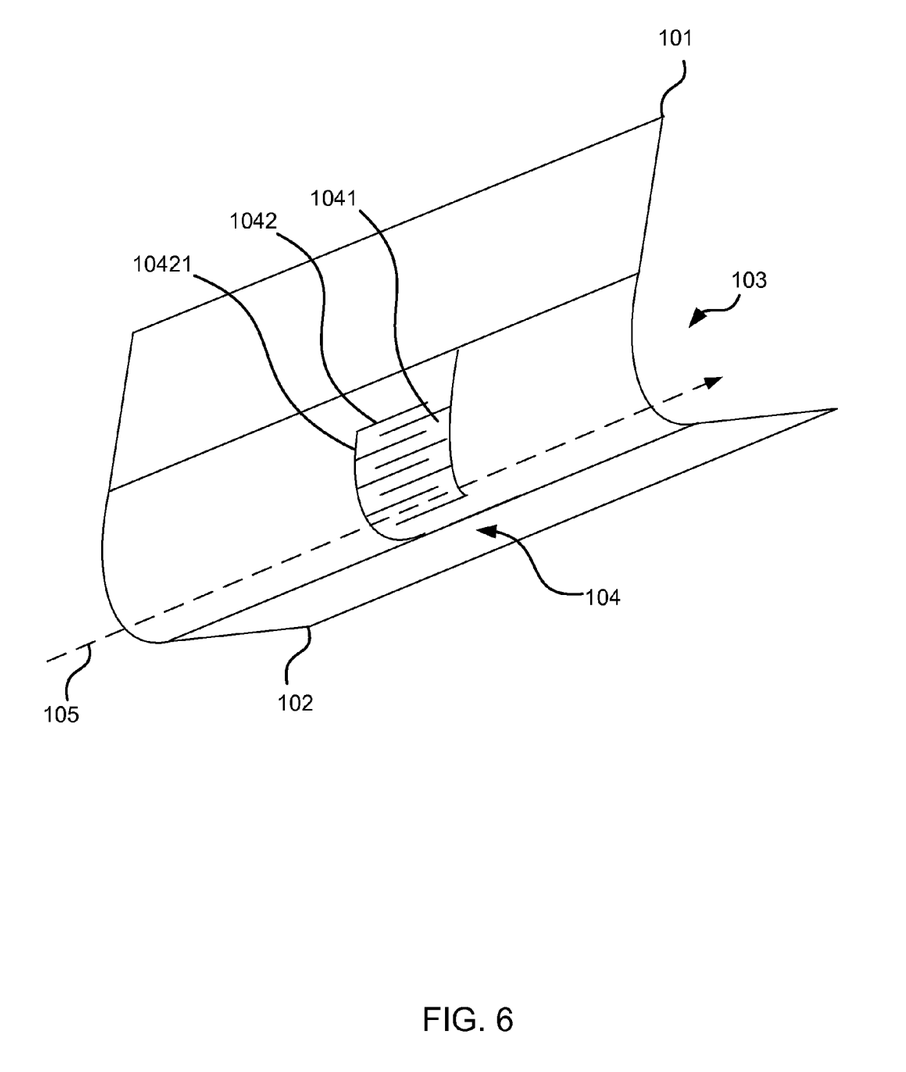
FIG. 6 illustrates a cross section of a schematic representation of the folding area with a sensor of the foldable display device according to another embodiment.

FIG. 6 illustrates an embodiment of the folding area 103 with a sensor 104 of the foldable display device 100. The sensor 104 is located in the folding area 103. However, the collecting conductor lines 10421 may be connected to different parts of the device 100, the detector (not show in FIG. 6) being connected to the lines 10421. The collecting conductor lines 10421 need not be situated in the same part of the device 100, but they can be connected further away.

The sensor 104 may be situated in various locations of the folding area 103, and embodiments of FIGS. 5 and 6 illustrate merely some examples. According to an embodiment, the sensor 104 is located closer to an edge of the folding area 103. According to an embodiment, the sensor 104 is located closer to a central part of the folding area 103. According to an embodiment, the sensor 104 is configured to cover the whole of the folding area 103 which is subject to the deformation. For example, the sensor 104 covers an area within the folding area 103 starting from an end of the first part 101 to an end of the second part 102 and being in the central position of the folding area 103 (closer to the central part).

Figure 7:
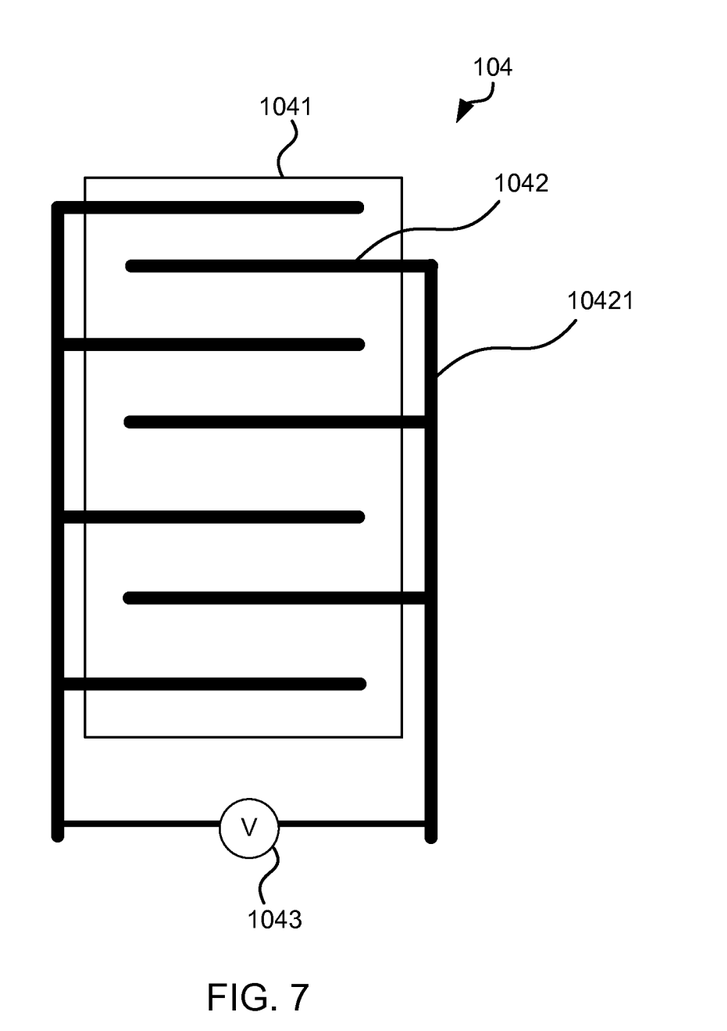
FIG. 7 illustrates a schematic representation of a sensor in accordance with an illustrative example.

FIG. 7 illustrates an embodiment of a sensor 104. According to an embodiment, the sensor may be a strain gauge configured to alter resistance based on a level of deformation. The sensor 104 includes a layer of strain sensitive material 1041 and a layer of conductor lines 1042. The conductivity of the strain sensitive material 1041 is configured to change when the layer 104 experiences the deformation. A layer of conductor lines 1042 is deposited next to the layer of strain sensitive material 1041. The layer of conductor lines 1042 is configured to detect the change of the conductivity of the strain sensitive material 1041. The layer of conductor lines 1042 is next to the layer of strains sensitive material 1041 so that it includes a plurality of contacting points with the strain sensitive material 1041.

Each contacting point may detect the deformation of the strain sensitive material 1041. The sensor 104 includes a detector 1043 which is configured to detect the conductivity change in the strain sensitive material 1041, which is conveyed to the detector 1043 via the conductor lines 1042. The embodiment of FIG. 7 illustrates two conductor lines 1042 with the strain sensitive material 1041 in between; however, it should be noted that the number of conductor lines 1043 may vary. The shape of the conductor lines 1042 and the strain sensitive material 1041 may also vary, and a rectangular shape is merely an example as shown in the embodiment of FIG. 7.

According to an embodiment, the strain sensitive material may be based on surface functionalized nanoparticles, piezoresistive materials, force sensing resistors, FSR. The strain of the sensor 104 contributes most on the conductivity change. In general, some materials can also exhibit piezoresistive effect. Piezoresistivity can be inherently linked to a change in interatomic distances in the material which in turns modifies the band gap of the material allowing, for example the material to be more or less conductive. However in the case of purely metallic nanoparticles linked with ligand molecules the conductivity change should be dominated purely by the interparticle distance change and the tunneling.

Figure 8:
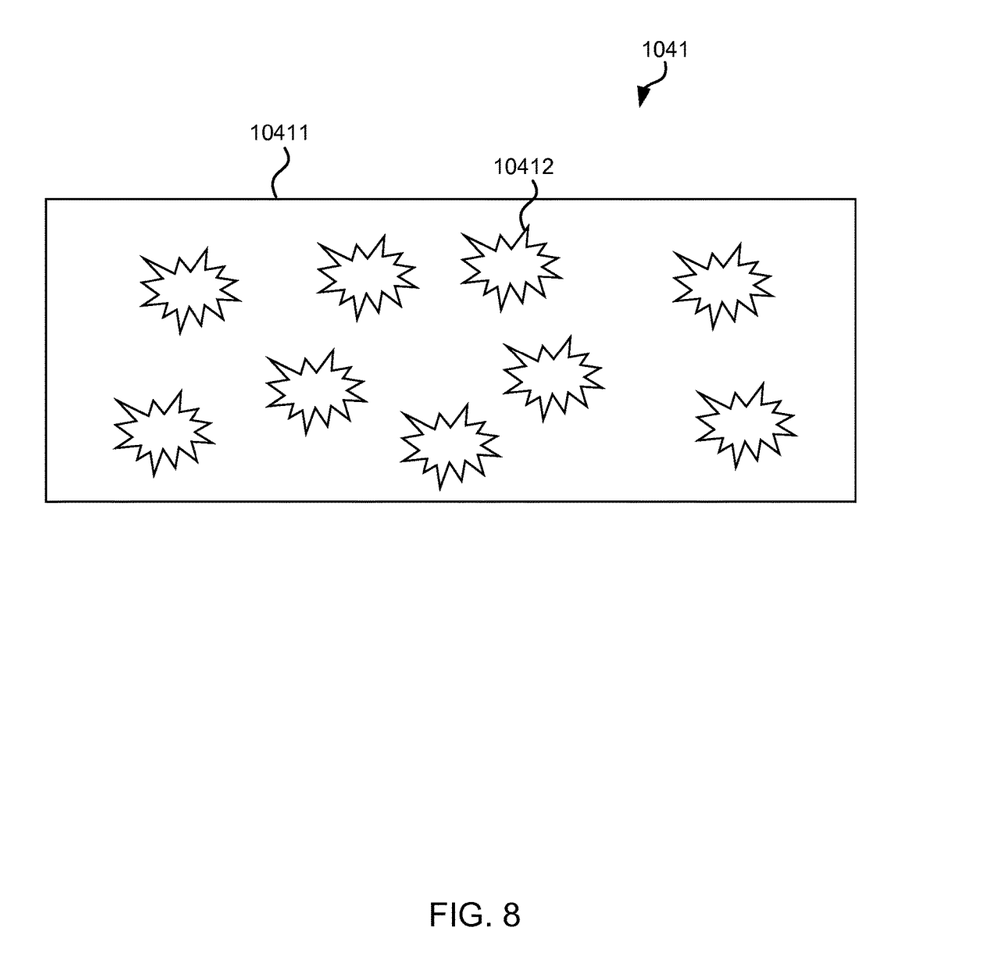
FIG. 8 illustrates a schematic representation of a strain sensitive material with particles in accordance with an embodiment.
Figure 9:
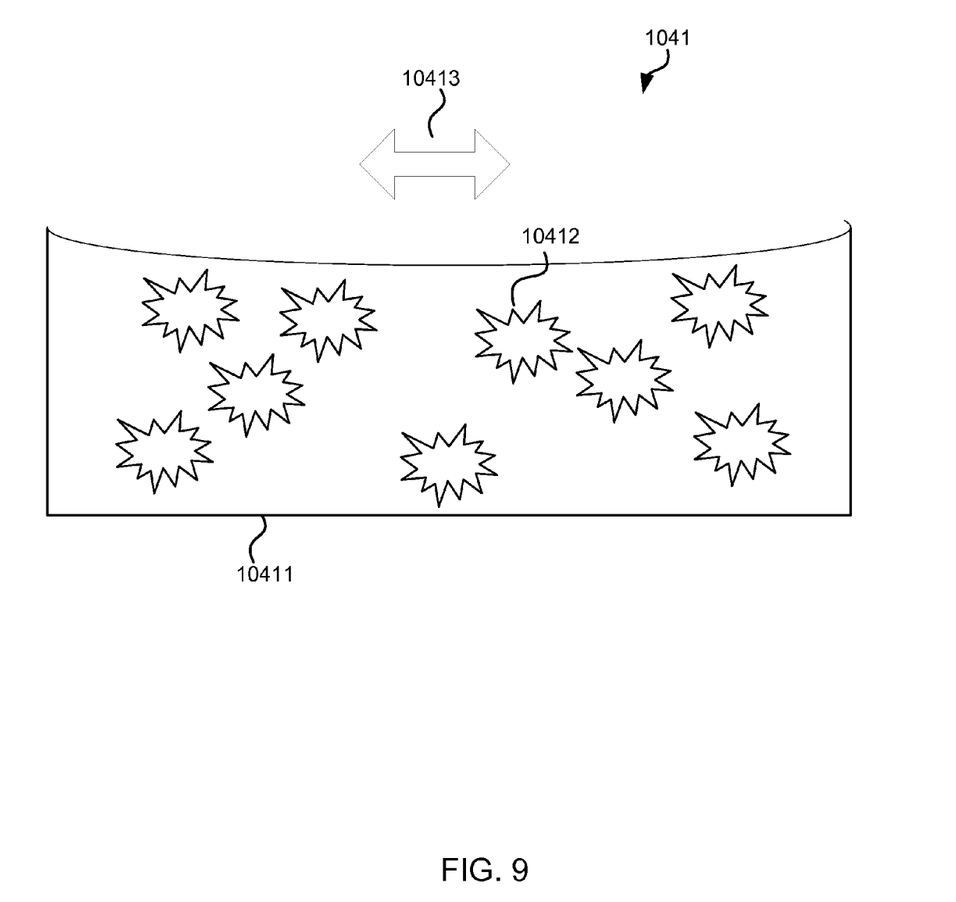
FIG. 9 illustrates a schematic representation of a strain sensitive material with particles in accordance with another embodiment.

Referring to the embodiments of FIG. 8 and FIG. 9, the strain sensitive material 1041 may, for example, include surface functionalized nanoparticles 10412 which exhibit an exponential conductivity response versus an applied strain 10413. These particles can be, but are not limited to, metallic nanoparticles or semiconductor metal oxide nanoparticles functionalized with appropriate ligand molecules. Such materials allow a very sensitive sensor 104 to be fabricated. More generally, other strain sensitive materials may be used, such as strain sensitive polymer materials, e.g. electroactive polymers and materials which exhibit piezoelectric response.

FIG. 8 is an illustrative embodiment of strain sensitive material 1041 comprising nanoparticles 10412. The strain sensitive material 1041 includes functionalized nanoparticles 10412 which are materials composed of, for example, metallic and/or semiconductor nanoparticles embedded in a matrix 10411. The nanoparticles 10412 can be functionalized with appropriate ligand molecules to enhance quantum mechanical (QM) tunneling between the nanoparticles 10412. In a non-deformation state, for example the normal resting state, such material 1041 acts like a near-perfect electrical insulator. The size of the nanoparticles 10412 can range from a few nanometers to hundreds of nanometers and their morphology can be sharp nanostructured "tips" or very high aspect ratio particles.

FIG. 9 illustrates an embodiment of strain sensitive material 1041 under the deformation. When the strain sensitive material 1041 is deformed, for example when a strain 10413 is applied, the distance between the functionalized nanoparticles 10412 is increased/decreased and the overall conductivity within the strain sensitive material 1041 is reduced/increased. An example of the reason of the conductance change is the quantum mechanical (QM) tunneling of the electrons from a nanoparticle to a neighboring nanoparticle via ligand molecules. More precisely, for example stretching increases the distance between the particles 10412 and consequently the width of the potential barrier, thus reducing electron tunneling probability and allowing less electrons to conduct electricity within the material. The stretching may occur on an outer surface of the foldable area 103. Consequently, when the material 1041 is pressed, the compression causes mechanical deformation that induces an increase of the polymer thickness among the conducting or semiconducting nanoparticles 10412. Subsequently, the distance between the nanoparticles 10412 is decreased and the overall conductivity within the strain sensitive material 1041 is increased. The compression may occur on an inner surface the foldable area 103.

Classically, an electron cannot penetrate into or across a potential barrier if its kinetic energy is smaller than the height of the potential barrier. According to quantum mechanics, an electron has a finite probability density inside and/or on the other side of the potential barrier even though the kinetic energy is lower than the height of the barrier. Thus, the electron can experience a phenomenon called quantum mechanical tunneling through the barrier. The inherent reason lies in the wave-particle duality and the Heisenberg uncertainty relation of quantum mechanics.

The criteria for the QM tunneling are: 1) wavefunction overlapping between the conductors/semiconductors, and thus a small distance between the nanoparticles; 2) availability of the density of electronic states for the tunneling electrons to occupy; 3) fermi-level disparity across the potential barrier, and thus a potential difference, for example a voltage. The resultant tunneling current is exponentially dependent on the distance between the conducting or semiconducting nanoparticles 10412.

Taking into account the tunneling phenomena, in functionalized nanoparticle materials 1041 the conduction and the resistance of the film is exponentially dependent on the width of the potential barrier, and thus the distance between the particles 10412.

Application of a strain 10413 would reduce or increase the inter-particle separation, and the tunneling probability is increased or decreased depending on a direction of the force, for example whether the force is stretching or compressing. Even very small deformation may be enough for generating a conducting tunneling path. Consequently, a very sensitive sensor 104 may be made.

The strain sensitive material 1041 may be placed either on top of the conductor lines 1042 or under or within them.

Figure 10:
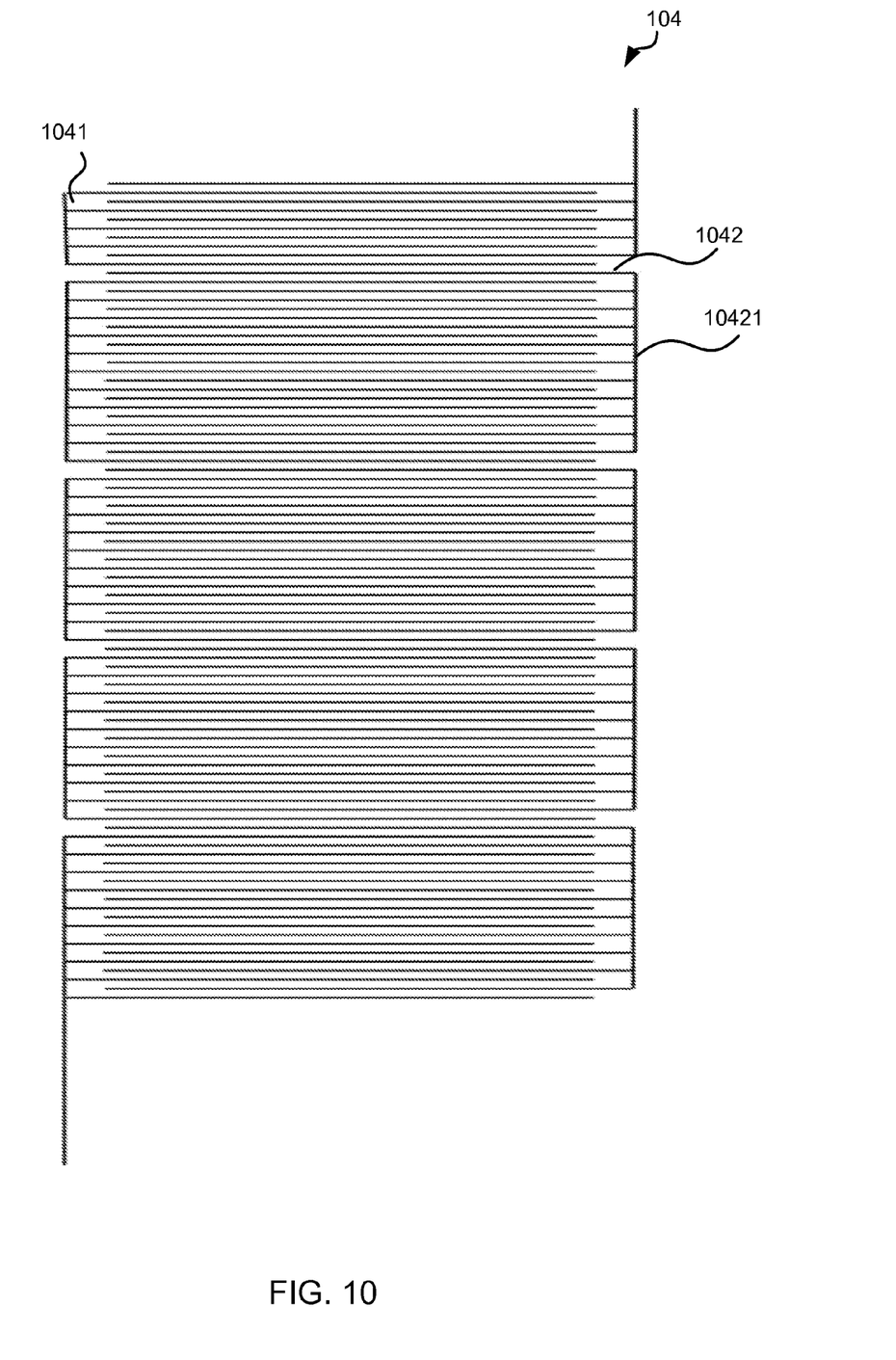
FIG. 10 illustrates a schematic representation of a sensor of the foldable device according to an embodiment.

FIG. 10 illustrates an embodiment of the sensor 104. The physical size of the sensor 104 may vary. For example the area of the strain sensitive material 1041 and the number of the conductor lines 1042 and the collecting conductor lines 10421 may vary. FIG. 10 illustrates an embodiment that has more conductor lines 1042 and collecting conductor lines 10421 and a larger area of the material 1041 than the embodiment of FIG. 7. The sensitivity of the sensor 104 may depend on the number of conductor lines 1041. An increase in the number of conductor lines 1042 may improve the sensitivity of the sensor 104. Furthermore, an increase in the area of the strain sensitive material 1041 may also increase the sensitivity.

Figure 11:
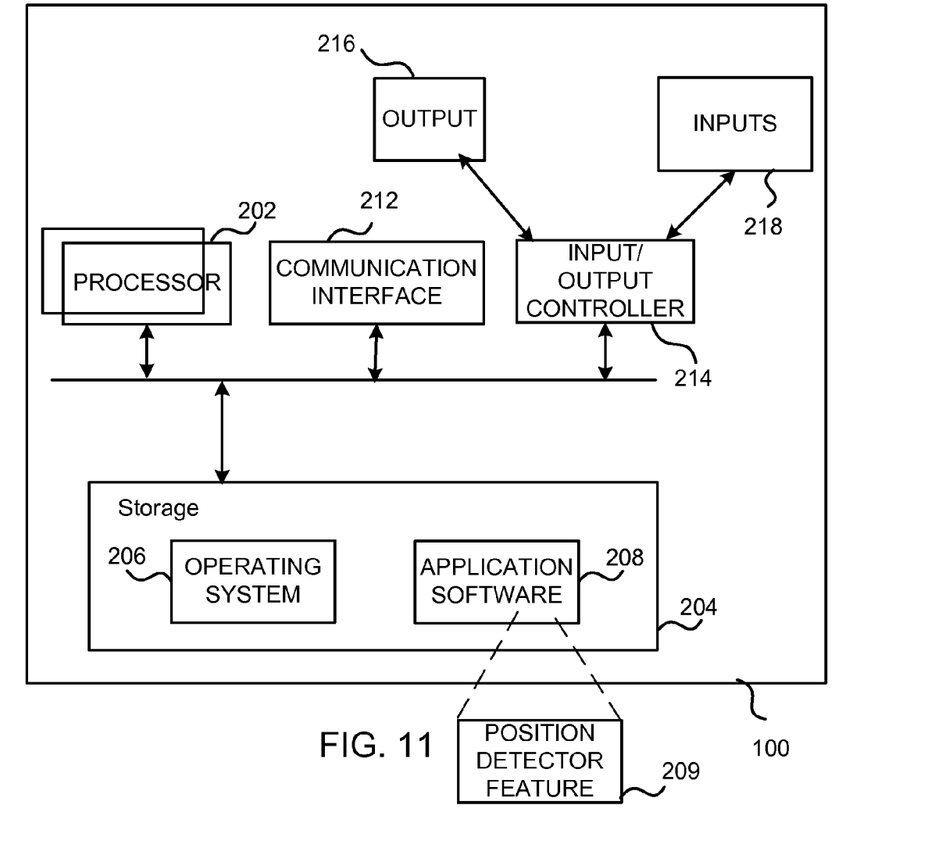
FIG. 11 illustrates a schematic representation of the foldable display device with a position detector according to an embodiment.

FIG. 11 illustrates a device 100 as a functional block diagram according to an embodiment. The device 100 comprises a processor 202, a memory 204, a communication interface 212, an input 218, an output 216, and an input/output controller 214. The processor 202 may be a single core or a multi core processor. According to an embodiment, the device 100 may comprise more than one processor. The memory 204 comprises an instruction set. According to an embodiment, the instruction set may comprise an operating system 206 and application software 208. According to another embodiment, the instruction set may comprise firmware (not illustrated in FIG. 11). The application software 208 comprises a position detector feature 209. The position detector feature 209 can receive a value from the detector 1043. The position detector feature 209 is configured to detect the position 1033 of the device 100. Furthermore, the position detector feature 209 may be configured to trigger an action based on the detected position. Operation and functionalities of the position detector feature 209 have been described in the embodiments of FIGS. 1 to 10. Furthermore, the position detection feature 209 may be configured for the operation of the method of FIG. 12.

The term 'computer', 'computing-based device', 'apparatus' or 'mobile apparatus' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

Figure 12:
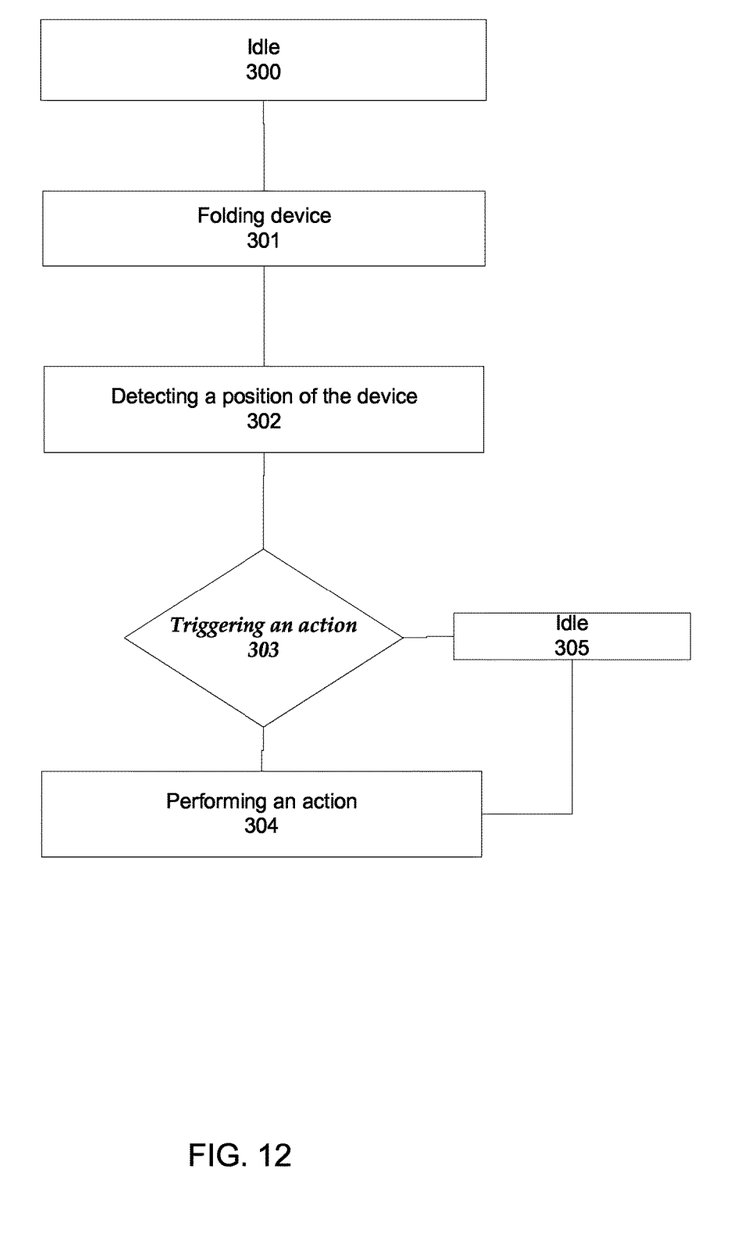
FIG. 12 illustrates an embodiment of a sequence diagram of a method for operating a foldable display device.

FIG. 12 illustrates an embodiment of a method for the foldable display device. In step 300 the device is in an idle mode. There is no action for the device and the device is not being folded or moved to another position. In step 301 the device is folded. The parts of the device are folded with respect to each other. The device takes a new position based on the folding. In step 302 the position of the device is detected. For example, an angle between the parts of the device can be detected. The sensor detects the current position of the device. The position may be detected after the folding has terminated or while the device is being folded. In step 303 an action is monitored. Based on the detected position of the device, an action may be triggered. The action may relate to the operation and functionality of the device. In step 304, if the action is triggered, the action is performed. In step 305 the device is in the idle mode. For example, the action has been performed and the device is not being folded.

The methods and functionalities described herein may be operated by software in machine readable form on a tangible storage medium e.g. in the form of a computer program comprising computer program code means adapted to perform all the functions and the steps of any of the methods described herein when the program is run on a computer and where the computer program may be embodied on a computer readable medium. For example, the embodiment of FIG. 11 may be configured accordingly. Examples of tangible storage media include computer storage devices comprising computer-readable media such as disks, thumb drives, memory etc. and do not include propagated signals. Propagated signals may be present in a tangible storage medium, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

According to that stated above, an embodiment 1. A device, comprising: folding area, wherein the folding area is configured to rotate according to an axis of rotation caused by folding the device, causing deformation of the folding area, wherein the folding area comprises: a layer of strain sensitive material having particles, wherein conductivity of the strain sensitive material is configured to change when the layer experiences the deformation; and a layer of conductor lines configured to detect the change of the conductivity of the strain sensitive material, wherein the layer of the conductor lines includes a plurality of contacting points with the strain sensitive material.

In addition or as an alternative to one or more of the embodiments, the conductor lines are substantially parallel to the axis of rotation caused by folding the device.

In addition or as an alternative to one or more of the embodiments, the conductor lines are connected from an end to a collecting conductor line which is configured to be transversal to the axis of rotation.

In addition or as an alternative to one or more of the embodiments, the conductor lines and the collecting conductor line are configured as a comb shape so as to substantially cover an area of the strain sensitive material.

In addition or as an alternative to one or more of the embodiments, further including a detector connected to the conductor lines and configured to detect a position of the device based on the conductivity.

In addition or as an alternative to one or more of the embodiments, the position comprises an angle between a first and a second part of the device with respect to the folding area.

In addition or as an alternative to one or more of the embodiments, the detector is further configured to trigger an action of the device when a threshold position is reached.

In addition or as an alternative to one or more of the embodiments, further including a first and a second part of the device, wherein the folding area is provided between the parts, and wherein the layer of strain sensitive material and the layer of conductor lines are configured to cover a part of the folding area that starts from an end of the first part and extends to an end of the second part and that is subject to the deformation.

In addition or as an alternative to one or more of the embodiments, the sensor area comprises areas having different deformations, and the layer of strain sensitive material and the layer of conductor lines are configured to conform to the different deformations.

In addition or as an alternative to one or more of the embodiments, further including a display including a plurality of layers, wherein the folding area is configured as a part of the display.

In addition or as an alternative to one or more of the embodiments, the conductivity of the strain sensitive material is configured to increase when the layer of the strain sensitive material experiences the deformation by compression; or wherein the conductivity of the strain sensitive material is configured to decrease when the layer of the strain sensitive material experiences the deformation by strain.

In addition or as an alternative to one or more of the embodiments, the strain sensitive material comprises a strain sensitive ink material.

In addition or as an alternative to one or more of the embodiments, the strain sensitive material comprises a functionalized nanoparticle material, wherein the particles comprise the nanoparticles and ligand molecules.

In addition or as an alternative to one or more of the embodiments, the particles comprise metallic nanoparticles; or wherein the particles comprise semiconductor nanoparticles.

In addition or as an alternative to one or more of the embodiments, the particles are embedded in a matrix, and the strain sensitive material comprises the matrix and embedded particles.

In addition or as an alternative to one or more of the embodiments, when the layer of the strain sensitive material experiences the deformation, thickness of the matrix, including the particles, is changed and an interparticle distance is changed so as to change the conductivity.

In addition or as an alternative to one or more of the embodiments, the change of the conductivity is based on quantum mechanical tunneling of electrons from a particle to a neighboring particle via linked ligand molecules.

In addition or as an alternative to one or more of the embodiments, the strain sensitive material is configured on top of the conductor lines; or the strain sensitive material is configured under the conductor lines; or the conductor lines are configured within the strain sensitive material.

According to an embodiment a method comprising: folding a device, wherein a folding area of the device is configured to rotate according to an axis of rotation, causing deformation of the folding area, wherein the folding area comprises: a layer of strain sensitive material having particles, wherein conductivity of the strain sensitive material is configured to change when the layer experiences the deformation; and a layer of conductor lines configured to detect the change of the conductivity of the strain sensitive material, wherein the layer of the conductor lines includes a plurality of contacting points with the strain sensitive material; detecting a position of the device based on the detected change of the conductivity.

According to an embodiment, a foldable display module, comprising: a folding area, wherein the folding area is configured to rotate according to an axis of rotation caused by folding the module, causing deformation of the folding area, wherein the folding area comprises: a layer of strain sensitive material having particles, wherein conductivity of the strain sensitive material is configured to change when the layer experiences the deformation; and a layer of conductor lines configured to detect the change of the conductivity of the strain sensitive material, wherein the layer of the conductor lines includes a plurality of contacting points with the strain sensitive material.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device comprising a top portion for viewing visual content, the device comprising:
   a first part of the device having a first planar portion;
   a second part of the device having a second planar portion;
   a folding area coupled to and between the first part and the second part of the device, wherein the folding area is configured to rotate around an axis of rotation caused by folding the device, causing deformation of the folding area;
   a layer of strain sensitive material positioned entirely within a portion of the folding area that bends around the axis of rotation;
   conductor lines touching the layer of strain sensitive material, the conductor lines configured to detect a change in conductivity of the strain sensitive material during deformation of the folding area;
   one or more collecting conductor lines extending through both: (1) the portion of the folding area that bends around the axis of rotation, and (2) at least one of the first planar portion of the first part of the device or the second planar portion of the second part of the device, the one or more conductor lines configured to electrically communicate the change in conductivity of the strain sensitive material detected by the conductor lines; and
   a sensor configured to determine a position of the device based on the detected change of the conductivity of the strain sensitive material in the folding area.

2. The device of claim 1, wherein the conductor lines are substantially parallel to the axis of rotation caused by folding the device.

3. The device of claim 1, wherein the conductor lines are connected from an end to a collecting conductor line which is configured to be transversal to the axis of rotation.

4. The device of claim 3, wherein the conductor lines and the collecting conductor line are configured as a comb shape so as to substantially cover an area of the strain sensitive material.

5. The device of claim 1, further including a detector connected to the conductor lines and configured to detect a position of the device based on the conductivity.

6. The device of claim 5, wherein the position comprises an angle between a first and a second part of the device with respect to the folding area.

7. The device of claim 5, wherein the detector is further configured to trigger an action of the device as a threshold position is reached.

8. The device of claim 1, further including a first and a second part of the device, wherein the folding area is provided between the parts, and wherein the layer of strain sensitive material and the layer of conductor lines are configured to cover a part of the folding area that starts from an end of the first part and extends to an end of the second part and that is subject to the deformation.

9. The device of claim 1, wherein the sensor area comprises areas having different deformations, and the layer of strain sensitive material and the layer of conductor lines are configured to conform to the different deformations.

10. The device of claim 1, further including a display including a plurality of layers, wherein the folding area is configured as a part of the display.

11. The device of claim 1, wherein the conductivity of the strain sensitive material is configured to increase as the layer of the strain sensitive material experiences the deformation by compression or decrease as the layer of the strain sensitive material experiences the deformation by strain.

12. The device of claim 1, wherein the strain sensitive material comprises a functionalized nanoparticle material, wherein the particles comprise the nanoparticles and ligand molecules.

13. The device of claim 1, wherein the particles comprise metallic nanoparticles.

14. The device of claim 1, wherein the particles are embedded in a matrix, and the strain sensitive material comprises the matrix and embedded particles.

15. The device of claim 14, wherein, as the layer of the strain sensitive material experiences the deformation, thickness of the matrix, including the particles, is changed and an interparticle distance is changed so as to change the conductivity.

16. The device of claim 1, wherein the change of the conductivity is based on quantum mechanical tunneling of electrons from a particle to a neighboring particle via linked ligand molecules.

17. The device of claim 1, wherein the strain sensitive material comprises semiconductor nanoparticles.

18. A method detecting a position of a first part of a device relative to a second part of the device, wherein the device comprises a top portion for viewing visual content and a folding area between and coupled to the first part of the device and the second part of the device, the method comprising:

folding the device at the folding area comprising moving a first planar portion of the first part around an axis of rotation of the folding area in relation to a second planar portion of the second part of the device, wherein the folding area comprises:
a layer of strain sensitive material positioned entirely within a portion of the folding area that bends around the axis of rotation, wherein conductivity of the strain sensitive material is configured to change as the layer experiences the deformation, and
conductor lines touching the layer of strain sensitive material, the conductor lines configured to detect a change in the conductivity of the strain sensitive material during deformation of the folding area, and
one or more collecting conductor lines extending through both: (1) the portion of the folding area that bends around the axis of rotation, and (2) at least one of the first planar portion of the first part of the device or the second planar portion of the second part of the device, the one or more conductor lines configured to electrically communicate the change in conductivity of the strain sensitive material detected by the conductor lines; and
detecting a position of the first part of the device relative to the second part of the device based on the detected change of the conductivity of the folding area.

19. A foldable display module comprising a top portion for viewing visual content, a first part having a first planar portion and a second part having a second planar portion, the foldable display module comprising:
a folding area coupled to and between the first part and the second part, wherein the folding area is configured to rotate around an axis of rotation caused by folding the module, causing deformation of the folding area, wherein the folding area comprises:
a layer of strain sensitive material having particles and positioned entirely within a portion of the folding area, wherein conductivity of the strain sensitive material is configured to change as the layer experiences the deformation,
conductor lines touching the layer of strain sensitive material, the conductor lines configured to detect a change of the conductivity of the strain sensitive material during deformation of the folding area, and
one or more collecting conductor lines extending through both: (1) the portion of the folding area that bends around the axis of rotation, and (2) at least one of the first planar portion of the first part of the device or the second planar portion of the second part of the device, the one or more conductor lines configured to electrically communicate the change in conductivity of the strain sensitive material detected by the conductor lines; and
a position detector executable by a processor to determine a position of the device based on the detected change of the conductivity of the strain sensitive material in the folding area detected from the conductor lines.

20. The foldable display module of claim 19, wherein the layer of strain sensitive material and the layer of conductor lines are embedded inside of a mobile computing device.

* * * * *